United States Patent [19]
Colombet et al.

[11] Patent Number: 5,578,668
[45] Date of Patent: Nov. 26, 1996

[54] WATER-REDISPERSIBLE POWDERS OF VINYL/ACRYLIC POLYMERS

[75] Inventors: Jean-Francois Colombet, Rueil Malmaison; Bruno Thiebaut, Cachan, both of France

[73] Assignee: Rhone-Poulenc Chimie, Courbevoie Cedex, France

[21] Appl. No.: 811,980

[22] Filed: Dec. 23, 1991

[30] Foreign Application Priority Data

Dec. 21, 1990 [FR] France ................................ 90 16078

[51] Int. Cl.$^6$ ................................ C08K 3/34; C08K 5/54
[52] U.S. Cl. ...................... 524/265; 524/266; 525/100; 525/101; 525/106
[58] Field of Search ...................... 524/265, 266; 525/100, 101, 106

[56] References Cited

U.S. PATENT DOCUMENTS

| | | | |
|---|---|---|---|
| 2,884,388 | 4/1959 | Hedlund | 525/100 |
| 3,644,566 | 2/1972 | Kincheloe et al. | 525/100 |
| 3,716,399 | 2/1973 | Nitzsche et al. | 117/123 D |
| 3,898,189 | 8/1975 | Bonnaud et al. | 524/501 |
| 4,113,691 | 9/1978 | Ward | 260/37 EP |
| 4,151,135 | 4/1979 | McClain | 260/23 R |
| 4,291,135 | 9/1981 | Höhlein et al. | 525/101 |
| 4,328,319 | 5/1982 | Osipow et al. | 521/78 |
| 4,725,648 | 2/1988 | Fujimoto et al. | 525/100 |
| 4,748,215 | 5/1988 | Lindner et al. | 525/479 |
| 5,017,630 | 5/1991 | Raines et al. | 523/334 |
| 5,084,535 | 1/1992 | Hennig et al. | 526/211 |
| 5,202,368 | 4/1993 | Davies et al. | 524/266 |

FOREIGN PATENT DOCUMENTS

| | | |
|---|---|---|
| 618462 | 7/1980 | Switzerland . |
| 1572906 | 6/1980 | United Kingdom . |

*Primary Examiner*—Paul R. Michl
*Assistant Examiner*—John J. Guarviello
*Attorney, Agent, or Firm*—Burns, Doane, Swecker & Mathis, L.L.P.

[57] ABSTRACT

Water-dispersible, storage-stable pulverulent compositions of matter, well adopted as adjuvants for hydraulic binders used in the construction industry, comprise particulates of a water-insoluble film-forming vinyl and/or acrylic polymer, e.g., a vinyl ester, alkyl(meth)acrylate or vinylaromatic homopolymer or copolymer, containing from 0.5 to 20 parts by weight of at least one silicone, e.g., an alkali or alkaline earth metal organosiliconate or a liquid organopolysiloxane, per 100 parts by weight of such film-forming polymer.

10 Claims, No Drawings

WATER-REDISPERSIBLE POWDERS OF VINYL/ACRYLIC POLYMERS

BACKGROUND OF THE INVENTION

1. Field of the Invention

The present invention relates to water-redispersible, storage-stable pulverulent compositions based on particulates of a water-insoluble vinyl and/or acrylic polymer. This invention also relates to the use of such powders, for example as a component of hydraulic binders for the construction industry.

2. Description of the Prior Art

Redispersible powders which are produced by spray drying dispersions of vinyl and/or acrylic polymers, especially dispersions of vinyl ester polymers, are known to this art.

To successfully produce powders which do not agglomerate during storage under the influence of pressure and of temperature and which are conveniently redispersible in water, large amounts of inert materials and of protective colloids are typically added thereto.

Vinyl and/or acrylic polymers are frequently used as adjuvants in hydraulic inorganic binder compositions to improve their intended applications and improve the properties of the material after hardening, such as adhesion to various substrates, impermeability, flexibility and mechanical properties. The redispersible powders have the advantage over aqueous dispersions that they can be premixed with the cement in the form of ready-to-use pulverulent compositions which may be employed, for example, for the manufacture of mortars and the concretes intended to be bonded to building materials, or for the manufacture of adhesive mortars, or for the production of protective coatings and decorative coatings for the inside or outside of buildings.

However, it is known to this art that the adhesion of the hardened coatings diminishes after exposure to a moist environment.

To prevent the agglomeration of redispersible powders of polymers without adversely affecting the adhesive properties thereof, it has been proposed to add to the dispersions, prior to spraying, melamine/formaldehyde/sulfonate condensation products (U.S. Pat. No. 3,784,648) or naphthalene/formaldehyde/sulfonate condensation products (DE-A-3,143,070) and/or vinylpyrrolidone/vinyl acetate copolymers (EP-78,449). These water-soluble compounds, however, do not provide improvement in respect of the aforesaid loss of adhesion in the moist state.

SUMMARY OF THE INVENTION

Accordingly, a major object of the present invention is the provision of improved water-insoluble dispersible powders which are stable on storage without agglomeration and which permit enhancing the adhesion to a given substrate, after moist storage, of hydraulic binder formulations containing such powders.

Briefly, the present invention features dispersible pulverulent compositions of water-insoluble film-forming vinyl and/or acrylic polymers comprising from 0.5 to 20 parts by weight of at least one silicone per 100 parts by weight of the film-forming polymer.

DETAILED DESCRIPTION OF THE PREFERRED EMBODIMENTS OF THE INVENTION

More particularly according to the present invention, by "water-insoluble film-forming polymers" are intended homopolymers and copolymers of vinyl and/or acrylic monomers having a glass transition temperature ranging from about −20° C. to +50° C., preferably from 0° C. to 40° C. These polymers can be prepared in a manner per se known to this art via emulsion polymerization of ethylenically unsaturated monomers by means of polymerization initiators, in the presence of conventional emulsifiers and/or dispersing agents. The polymer content in the dispersion typically ranges from 10% to 70% by weight, more specifically from 35% to 65% by weight.

Exemplary such monomers include the vinyl esters and more particularly vinyl acetate; the alkyl acrylates and methacrylates, the alkyl moiety of which has from 1 to 10 carbon atoms, for example methyl, ethyl, n-butyl and 2-ethylhexyl acrylates and methacrylates; the vinylaromatic monomers, in particular styrene. These monomers can be copolymerized with one another or with other ethylenically unsaturated comonomers.

Exemplary monomers copolymerizable with vinyl acetate and/or acrylic esters and/or styrene include ethylene and olefins such as isobutene; vinyl esters of branched or unbranched saturated monocarboxylic acids having from 1 to 12 carbon atoms, such as vinyl propionate, vinyl "versarate" (a registered trademark for the esters of branched $C_9$-$C_{11}$ acids), vinyl pivalate and vinyllaurate; esters of monocarboxylic or dicarboxylic unsaturated acids having 3 to 6 carbon atoms with alkanols having 1 to 10 carbon atoms, such as methyl, ethyl, butyl or ethylhexyl maleate and fumarate; vinylaromatic monomers such as the methylstyrenes and the vinyltoluenes; vinyl halides such as vinyl chloride and vinylidene chloride; and diolefins, especially butadiene.

The silicone is advantageously selected from among the alkali metal or alkaline earth metal organosiliconates and the organopolysiloxanes which are liquid at ambient temperature.

The alkali metal or alkaline earth metal organosiliconates are known materials, the majority of which are commercially available. The most common are the sodium or potassium methylsiliconates having an about 30% to 60% solids content.

The organosiliconates can be prepared, for example, by hydrolysis of the corresponding organosilanes having three hydrolyzable groups, such as halogen atoms or alkoxy radicals, followed by dissolving the resulting product in a solution of a strong inorganic base, in such proportions that there exists at least one equivalent of base per silicon atom (see, for example, U.S. Pat. Nos. 2,441,422, 2,441,423 and 2,507,200).

The organopolysiloxanes are also known polymers. The polymer may be linear, cyclic or branched and may be water-soluble or water-insoluble. The organic radicals are monovalent hydrocarbon radicals having from 1 to 10 carbon atoms. The polymer can furthermore comprise one or more hydrogen atoms bonded to the silicon and/or one or more hydroxyl and/or alkoxy groups. The linear polymers comprise diorganosiloxy recurring structural units of the formula $T_2SiO$, in which the symbols T, which may be identical or different, are hydrocarbon radicals having from 1 to 10 carbon atoms, which either may or may not be substituted by halogen atoms or cyano groups.

Exemplary hydrocarbon radicals, represented by the symbols T, include:

(i) alkyl radicals having from 1 to 10 carbon atoms, such as methyl, ethyl, propyl, isopropyl, butyl, pentyl, hexyl, 2-ethylhexyl, octyl and decyl radicals;

(ii) cycloalkyl radicals having 1 to 10 carbon atoms, such as cyclopentyl and cyclohexyl radicals;

(iii) alkenyl radicals having from 2 to 4 carbon atoms, such as vinyl, allyl and but-2-enyl radicals; and (iv) mononuclear aryl radicals having from 6 yo 10 carbon atoms, such as phenyl, tolyl and xylyl radicals.

The methyl, phenyl and vinyl radicals are the preferred.

Representative organopolysiloxane polymers comprise:

(a) α,ω-bis(triorganosiloxy)diorganopolysiloxane polymers, the organic radicals bonded to the silicone atoms of which are selected from among methyl, vinyl and phenyl radicals, for example α,ω-bis(trimethylsiloxy)-dimethylpolysiloxanes of preferred viscosity 5 mPa.s to 10,000 mPa.s at 25° C.;

(b) α,ω-di(hydroxy)diorganopolysiloxane polymers blocked at each end of their polymer chains by a hydroxyl group, of preferred viscosity 5 mPa.s to 5,000 mPa.s at 25° C., for example the α,ω-di(hydroxy)-methylphenylpolysiloxane oils;

(c) polymers of the above types in the form of gums having a viscosity greater than about 500,000 mPa.s, these gums being employed in the form of an aqueous emulsion;

(d) branched organosiloxane polymers (silicone resins) which are liquid at ambient temperature and which comprise one or more structural units selected from among those of the formulae $R_2SiO$ (unit D), $RSiO_{1.5}$ (unit T) and $SiO_2$ (unit Q) in which the radicals R are alkyl radicals having from 1 to 6 carbon atoms; and (e) organohydrogenopolysiloxane polymers.

The alkali metal or alkaline earth metal organosiliconates and the linear, cyclic or branched liquid organopolysiloxanes can of course be used individually, or in admixture with one another. It is also possible to use mixtures comprising one or more organosiliconates and one or more organopolysiloxanes. The silicone is present in the powders according to the invention in an amount ranging from 0.5% to 20% by weight relative to the weight of the film-forming vinyl polymer, preferably at least 1% by weight.

The dispersible powders can furthermore contain conventional additives emanating from the production of the polymers, as well as other conventional additives and adjuvants, such as protective colloids and anti-caking agents. The amount of protective colloid, for example polyvinyl alcohol or polyethylene glycol, can range up to 15% by weight relative to the weight of polymer and the amount of anti-caking agent typically ranges from 1% to 20% of the total weight of the powder. The anti-caking agents are generally inorganic materials having a mean particle size ranging from 0.01 to 50 μm. Exemplary such agents include silicoaluminates, silicas, clays, talc, gypsum, calcium carbonate, etc.

The dispersible powder is prepared by spray drying an aqueous dispersion of the vinyl and/or acrylic polymer. According to the present invention, a silicone is added to the dispersion, before spraying, in liquid form and in an amount ranging from 0.5 to 20 parts by weight per 100 parts by weight of polymer in dispersion. The incorporation of the silicone into the dispersion can be effected, as appropriate, in the form of an aqueous solution, as, for example, with an alkali metal siliconate or alkaline earth metal siliconate, or in the form of an emulsion. The solids concentration of the ready-to-dry mixture preferably ranges from 30% to 42% by weight.

The spray drying can be carried out in the usual manner in any known apparatus such as, for example, an atomizing tower wherein spraying effected by means of a nozzle or turbine is combined with a stream of hot gas. The inlet temperature of the hot gas, which is typically air, preferably ranges from 103° to 115° C., and the outlet temperature preferably ranges from 55° to 65° C. The anti-caking agents can be introduced into the apparatus separately from the dispersion.

The pulverulent compositions obtained are storage-stable; they can easily be redispersed in water and used in all known fields of application. They are very particularly suitable for use, in the construction industry, as additives to mixtures of hydraulic inorganic binders, for the production of protective and decorative coatings, adhesive mortars and adhesive cements intended for securing tiles, and floor coatings. They are particularly well suited for the formulation of cement-based, as well as plaster-based ready-to-use powder products.

In order to further illustrate the present invention and the advantages thereof, the following specific examples are given, it being understood that same are intended only as illustrative and in nowise limitative.

In said examples to follow, all parts and percentages are given by weight, except where indicated otherwise.

EXAMPLE 1

To a vinyl acetate/vinyl versatate copolymer latex (solids content 45%, minimum film-forming temperature=+5° C., Brookfield viscosity at 23° C. and 50 rpm=500 mPa.s) there was added a dimethylpolysiloxane oil blocked at each end of the polymer chain by a trimethylsiloxy group and having a viscosity of 100 mPa.s at 25° C., in an amount of 3% relative to the solids content of the dispersion.

The mixture was homogenized, diluted to 40% solids content and then charged into an atomizing tower. The drying temperature was 115° C. at the tower inlet and 60° C. at the outlet. Simultaneously, a kaolin powder (mean particle diameter 2 μm) was introduced continuously into the device in an amount of 12% relative to the solids content of the dispersion.

The powder thus prepared had excellent resistance to agglomeration under the influence of weight and of temperature. It was readily water-redispersible by simple stirring.

The powder was tested in an adhesive mortar formulation having the following composition:

|  | Parts |
| --- | --- |
| Polymer powder | 50 |
| Cement CPA 55 | 380 |
| Sand F 15 | 480 |
| Silica S1 | 115 |
| Cellulosic derivative | 5.5 |
| Water | 270 |

The adhesion was measured in accordance with the UEAtc Technical Guide for the Approval of Adhesives for Ceramic Coverings (March 1990).

The results below are given in comparison with a polymer powder not containing a silicone.

|  | Stripping force required, daN/cm² | |
| --- | --- | --- |
|  | 7 days, dry | 7 days, dry + 7 days, moist |
| Example 1 | 20 | 7 |
| Control | 21 | 5 |

EXAMPLE 2

A powder was prepared following the procedure of Example 1, except that the silicone used was 2.5% of potassium methylsiliconate, introduced in the form of an aqueous solution having a 40% solids content.

The results for the adhesion of the adhesive mortar were as follows:

|  | Stripping force required, daN/cm² | |
|---|---|---|
|  | 7 days, dry | 7 days, dry + 7 days, moist |
| Example 2 | 23 | 8 |
| Control | 19 | 5 |

EXAMPLE 3

A powder was prepared following the procedure of Example 1, with addition, as the silicone, of 3% of dimethylpolysiloxane oil and 1.5% of potassium methylsiliconate, introduced in the form of an aqueous solution having a 40% solids content.

The results for the adhesion of the adhesive mortar were as follows:

|  | Stripping force required, daN/cm² | | |
|---|---|---|---|
|  | 7 days, dry | 7 days, dry + 7 days moist | 7 days, dry + 21 days moist |
| Example 3 | 23 | 10 | 9 |
| Control | 21 | 5 | 4 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A water-dispersible, storage-stable pulverulent composition of matter, comprising particulates of a water-insoluble film-forming vinyl and/or acrylic polymer containing from 0.5 to 20 parts by weight of at least one silicone per 100 parts by weight of said film-forming polymer.

2. The pulverulent composition as defined by claim 1, said film-forming polymer comprising a homopolymer or copolymer of a vinyl ester, alkyl acrylate, alkyl methacrylate or vinylaromatic monomer.

3. The pulverulent composition as defined by claim 2, said film-forming polymer comprising a vinyl acetate homopolymer or copolymer.

4. The pulverulent composition as defined by claim 2, said film-forming polymer comprising an alkyl acrylate or alkyl methacrylate homopolymer or copolymer.

5. The pulverulent composition as defined by claim 1, said at least one silicone comprising an alkali metal or alkaline earth metal organosiliconate, a liquid organopolysiloxane, or mixture thereof.

6. The pulverulent composition as defined by claim 1, comprising at least 1% by weight of said at least one silicone.

7. A process for the preparation of the pulverulent composition as defined by claim 1, comprising spray drying an aqueous dispersion of said film-forming polymer, said dispersion containing from 0.5 to 20 parts by weight of said at least one silicone per 100 parts by weight of said film-forming polymer.

8. The process as defined by claim 7, the solids content of said dispersion ranging from 30% to 42% by weight.

9. A hydraulic binder comprising an adjuvant amount of the pulverulent composition as defined by claim 1.

10. The hydraulic binder as defined by claim 9, further comprising a protective colloid and/or an anti-caking agent therefor.

* * * * *